United States Patent
Lomax, Jr. et al.

(10) Patent No.: US 6,896,041 B2
(45) Date of Patent: May 24, 2005

(54) HEAT EXCHANGE REACTOR HAVING INTEGRAL HOUSING ASSEMBLY

(75) Inventors: Franklin D. Lomax, Jr., Arlington, VA (US); Brian D. James, Alexandria, VA (US)

(73) Assignee: H2gen Innovations, Inc., Arlington, VA (US)

( * ) Notice: Subject to any disclaimer, the term of this patent is extended or adjusted under 35 U.S.C. 154(b) by 210 days.

(21) Appl. No.: 09/928,437

(22) Filed: Aug. 14, 2001

(65) Prior Publication Data

US 2003/0034152 A1 Feb. 20, 2003

(51) Int. Cl.$^7$ .............................. F28F 13/00; F28F 9/22
(52) U.S. Cl. ...................... 165/135; 165/145; 165/159
(58) Field of Search ................................ 165/158, 159, 165/174, 145, 135

(56) References Cited

U.S. PATENT DOCUMENTS

| | | | | | |
|---|---|---|---|---|---|
| 1,841,528 A | * | 1/1932 | Gebhardt | ..................... | 165/174 |
| 2,595,822 A | * | 5/1952 | Uggerby | ..................... | 165/159 |
| 3,240,675 A | * | 3/1966 | Weber | ......................... | 165/163 |
| 3,376,028 A | * | 4/1968 | Leason et al. | ............... | 165/159 |
| 3,607,118 A | * | 9/1971 | Johnson | ....................... | 165/159 |
| 3,942,482 A | * | 3/1976 | Barratt et al. | ................. | 122/32 |
| 4,479,353 A | * | 10/1984 | Schluderberg | ............... | 165/159 |
| 4,546,825 A | * | 10/1985 | Melnyk et al. | .............. | 165/159 |
| 4,653,575 A | * | 3/1987 | Courchesne | ................. | 165/159 |
| 4,983,471 A | * | 1/1991 | Reichner et al. | .............. | 429/19 |
| 5,143,800 A | * | 9/1992 | George et al. | ................. | 429/20 |
| 5,362,454 A | * | 11/1994 | Cizmer et al. | .............. | 165/158 |
| 5,447,195 A | * | 9/1995 | Luyts | .......................... | 165/159 |
| 5,630,470 A | * | 5/1997 | Lockwood, Jr. | ............. | 165/82 |
| 6,096,106 A | * | 8/2000 | Ruhl et al. | ................. | 48/197 R |

* cited by examiner

*Primary Examiner*—Leonard R. Leo
(74) *Attorney, Agent, or Firm*—Oblon, Spivak, McClelland, Maier & Neustadt, P.C.

(57) ABSTRACT

The present invention provides a heat exchange reactor, which includes at least one tube bundle containing a plurality of tubes arranged substantially parallel to a common longitudinal axis and within an external pressure housing, the bundle having first and second ends in respective first fluid communication with at least one first fluid inlet and at least one first fluid outlet, and the external pressure housing having at least one second fluid inlet and at least one second fluid outlet; at least one baffle oriented substantially perpendicular to the longitudinal axis and disposed about the bundle and configured as a manifold to control a flow of the second fluid; at least one layer of interior thermal insulation disposed between the bundle and the housing and in fluid communication with the second fluid. Other embodiments of the present invention include methods of using and methods of making the heat exchange reactor.

17 Claims, 3 Drawing Sheets

HEAT EXCHANGE REACTOR HAVING INTEGRAL HOUSING ASSEMBLY

BACKGROUND OF THE INVENTION

1. Field of the Invention

The present invention relates to a heat exchange reactor having a tube-and-shell construction, methods of its manufacture, and uses thereof.

2. Discussion of the Background

Heat exchange reactors are employed in many chemical processes where a reacting fluid must be heated by heat exchange from a second fluid. An excellent example of such a process is the generation of hydrogen from hydrocarbon feedstocks via catalytic steam reformation. The construction of such reactor vessels often closely resembles the common shell and tube heat exchanger construction known to those skilled in the art. Shell and tube heat exchange reactors for the steam reforming reaction are sold commercially, for example, by Haldor Topsoe, of Houston, Tex. Heat exchange reactors of shell and tube construction are also used to control the temperature of the water-gas shift reaction, as described in U.S. Pat. No. 4,554,223 to Yokoyama, et al.

Conventional heat exchange reactors employing a shell and tube construction must be provided with outer coverings, which serve several functions. These functions include the manifolding and pressure containment of the fluid flowing on the shell side of the assembly, insulation of the heat exchange reactor against heat loss to the ambient, and external structural support and stabilization of the complete assembly. Standard practice in the construction of tubular heat exchangers and heat exchange reactors provides an internal pressure shell, which fulfills the functions of pressure retention and fluid manifolding. This shell is then covered with one or more insulating layers to reduce heat loss to the ambient. Finally, the shell is supported structurally by members attached to the mechanical pressure shell. This general type of construction is documented in the literature, specifically in the *Standards of the Tubular Exchanger Manufacturers Association: 8th Edition*. This standard type of construction is evident in the heat exchange reactors of conventional systems, and has several particular drawbacks.

First, because of the high operating temperatures of many heat exchange reactors, particularly those for steam reforming of hydrocarbons, the strength of the internal pressure shell material is greatly reduced, which requires the shell thickness to be very thick relative to similar pressure vessels operated at ambient temperatures. In addition, the pressure shell material, which is usually metallic, must be selected from those alloys that have adequate high-temperature strength and corrosion resistance for the operating conditions. This usually requires stainless steel or nickel-based alloys, which are far more expensive and difficult to fabricate than materials suitable for lower-temperature construction. The use of a thick, metallic shell is particularly disadvantageous for heat exchange reactors because the shell must be heated to the operating temperature during startup of the reactor, which considerably lengthens the startup period and increases the thermal energy required for startup.

Second, the close fit between the pressure shell and the components of the internal tube bundle such as baffles or fins requires very close manufacturing tolerances, which undesirably increases the manufacturing cost of both the pressure shell and the tube bundle. This problem is exacerbated by the fact that most pressure shells are round in planform, which requires the aforementioned baffles and fins to be manufactured with a corresponding round planform: this is difficult to manufacture using high-rate techniques (such as stamping) and is wasteful of raw materials.

Third, the round planform of typical tubular arrays and heat exchanger shells undesirably causes the formation of thermal gradients both in the direction of fluid flow across the tube bundle and normal to the direction of flow unless a chorded array of tubes is employed. A chorded array is less efficient in filling a round planform shell of a given diameter, however, which increases the ratio of shell mass to reactor mass and exacerbates the deleterious effects of the heavy reactor shell described above. In the absence of a chorded array, extreme thermal stresses will be experienced in the tube arrays, thus reducing both their useful strength and useful operational lifetime. This problem is particularly acute in reactors employing very high shell-side inlet temperatures and rapid heat exchange, which features are otherwise desirable in heat exchange reactors to minimize volume, weight and cost.

Fourth, the installation of the insulation layers around the exterior of the pressure shell exposes the insulation to mechanical damage unless a separate outer covering is employed to prevent impact damage, water damage, wind damage, or damage due to the action of vermin. This outer covering undesirably adds weight, volume and cost to the heat exchange reactor without serving any other purpose. In addition, the installation of this covering must accommodate the means of structural support of the heat exchange reactor, and must therefore often be of a complex shape to prevent the ingress of water.

Fifth, the structural supports are generally connected to the tube bundle or to the pressure shell. Because these components are generally at elevated temperature, the structural members serve as a route for substantial heat loss to the ambient through rapid heat conduction away from heat exchange reactor surface. Because the structural members are also then at elevated temperature, they are usually also constructed of expensive alloys. Finally, the heat loss to the structural support, as well as its heavy metallic construction, further increases the required energy to bring the heat exchange reactor to operating conditions beyond the already undesirable state of affairs engendered by the use of the metallic pressure shell.

SUMMARY OF THE INVENTION

One object of the present invention is to solve the problems associated with conventional heat exchange reactors.

Another object of the present invention is to provide an integral housing for a heat exchange reactor.

Another object of the present invention is to provide an integral housing for a heat exchange reactor which simultaneously serves the purposes of gas manifolding, pressure retention, thermal insulation and structural support.

Another object of the present invention is to provide a heat exchanger having reduced thermal mass compared to conventional systems.

Another object of the present invention is to provide a heat exchange reactor having reduced warm-up time and energy expenditure.

Another object of the present invention is to reduce heat loss during operation compared to conventional systems.

Another object of the present invention is to provide an integral housing with simpler manufacture, lower materials cost, and less material usage than possible with conventional designs.

Another object of the present invention is to provide an integral housing which facilitates the use of square, rectangular, or polygonal tube bundles.

Another object of the present invention is to provide a heat exchanger and tube bundle components that may be manufactured with less scrap and simpler tooling than required in conventional systems with rounded internal pressure shells.

These and other objects have now been achieved by the present invention, the first embodiment of which provides a heat exchange reactor, which includes:

at least one tube bundle containing a plurality of tubes arranged substantially parallel to a common longitudinal axis and within an external pressure housing, the bundle having first and second ends in respective first fluid communication with at least one first fluid inlet and at least one first fluid outlet, and the external pressure housing having at least one second fluid inlet and at least one second fluid outlet;

at least one baffle oriented substantially perpendicular to the longitudinal axis and disposed about the bundle and configured as a manifold to control a flow of the second fluid;

at least one layer of interior thermal insulation disposed between the bundle and the housing and in fluid communication with the second fluid.

Another embodiment of the present invention provides a method for exchanging heat, which includes heating or cooling a first fluid with a second fluid in the above-described heat exchange reactor.

Another embodiment of the present invention provides a method of carrying out a reaction, which includes carrying out a reaction in a first fluid while exchanging heat with a second fluid in the above-described heat exchange reactor.

Another embodiment of the present invention provides a method for making a heat exchange reactor, which includes:

(a) preparing at least one tube bundle containing a plurality of substantially parallel tubes and having at least one baffle disposed about the bundle;

(b) mating a portion of the baffle to at least one sealing groove in at least one layer of thermal insulation; and (c) contacting the insulation with an external pressure housing.

Another embodiment of the present invention provides a method for making a heat exchange reactor, which includes:

(a) fabricating an outer housing;

(b) contacting at least one layer of thermal insulation with the outer housing;

(c) mating a portion of at least one baffle to at least one sealing groove in the insulation to form an assembly fixture; and (d) assembling the tube bundle with the assembly fixture.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
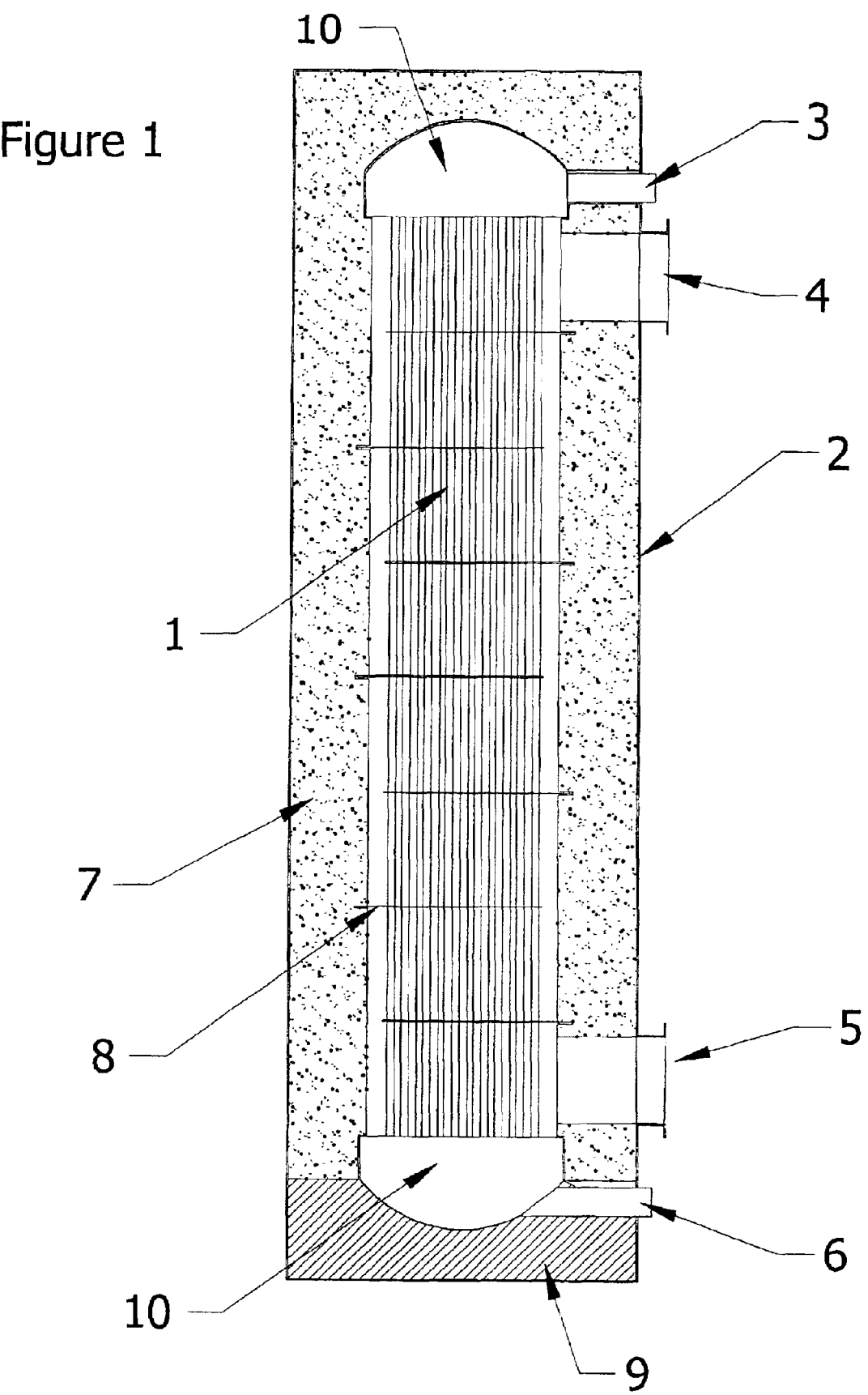
FIG. 1 is a section view showing a heat exchange reactor tube bundle mounted in an integral housing in accordance with a preferred embodiment of the present invention.

Various other objects, features and attendant advantages of the present invention will be more fully appreciated as the same becomes better understood from the following detailed description of the preferred embodiments of the invention.

One preferred embodiment of the present invention provides an integral housing assembly for heat exchange reactors employing a tube bundle construction with internal (within the tubes or "tube-side") flow of a first reacting fluid and the external (outside the tubes or "shell-side") flow about the tubes of a second fluid which may be both reacting and exchanging heat with the first reacting fluid, or simply exchanging heat with the first fluid. The tube- and shell-sides are preferably not in fluid contact with one another and are preferably only in thermal contact with one another. The integral housing of the present invention preferably includes:

an external pressure housing having at least one inlet and at least one outlet for the fluid flowing about the tube bundle, where the housing provides pressure retention of the flowing fluid and operates at a lower temperature than the flowing fluid, wherein the outer pressure housing also provides structural support for the heat exchange reactor tube bundle and thermal insulation, wherein the outer pressure housing also protects the internal components from mechanical damage due to impact, water, wind, or the action of vermin;

one or more thermally-insulating layers contained inside the external pressure housing, wherein at least one zone of the insulation provides structural load bearing to support the mass of the tube bundle and transmit it to the external pressure housing;

an innermost insulating layer cast, pressed, molded, machined, assembled from rigid insulating board or otherwise formed to provide a close fit between the baffles, fins, and other components of the tube bundle assembly in order to manifold the flowing fluid to effect the desired flow about the tube bundle while minimizing undesirable fluid bypass; and, optionally means for the support, thermal insulation, and/or manifolding of additional ancillary equipment such as various types of heat exchangers, burners, adiabatic reactors, absorbent beds, adsorbent beds, and plumbing for such ancillary components.

The terms "gas" and "fluid" are used interchangeably herein.

The term "substantially parallel" with respect to the tube bundle preferably means each tube in the tube bundle is independently within 3 degrees or less of parallel with the common longitudinal axis. More preferably, it means within 2 degrees or less, more particularly preferably within 1 degree or less, more especially preferably within 0.5 degrees or less, and most preferably 0.25 degrees or less. These ranges include 2.5, 1.5, 0.15 and parallel.

The term "substantially perpendicular" preferably means that a plane formed by a major surface of the baffle is, and independently for each baffle, within 10 degrees or less of perpendicular with the common longitudinal axis. More preferably, it means within 6 degrees or less, more particularly preferably within 2 degree or less, and most preferably 1 degree or less. These ranges include 9, 7, 5, 4, 3, 1, 0.5, 0.25, 0.15 and perpendicular.

The baffle is preferably disposed about the tube bundle. This preferably means that the holes in the baffle for accommodating the tubes provide a sliding close fit with some or preferably all of the tubes, or are fixedly connected to some or preferably all of the tubes via the inner diameters of some or preferably all of the holes. Preferably, the outer diameter of each respective tube is less than or equal to the inner diameter of the respective hole which accommodates that tube. Most preferably, the outer tube diameter is smaller than the hole inner diameter so that the tube and hole are not in contact with one another. The differences in the respective diameters may be as small as 20 thousandths of an inch.

FIG. 1 shows a heat exchange reactor tube bundle 1 with a fluid inlet 3 and a fluid outlet 6 for the fluid which passes through the inside of the tube bundle. These inlets and outlets are connected to manifolds 10, which provides a pressure-tight means of attachment to each individual tube, thus preventing fluid contact between the fluid passing through the tubes and the fluid flowing outside the tube bundle. The tube bundle is surrounded by an integral housing which includes an outer housing 2, one or more layers of thermal insulation 7, and one or more zones of thermal insulation providing structural support 9. At least one fluid inlet 5 and at least one fluid outlet 4 are provided to effect manifolding of the fluid or fluids flowing about the tube bundle. The outer structural housing 2 is also provided with ports to accommodate the tube bundle internal fluid inlet and outlet piping.

Because the outer housing is separated from the high-temperature fluids flowing either inside the tube bundle or about the tube bundle by the one or more insulating layers, it is maintained at a much lower temperature than these fluids. Although FIG. 1 shows that the outer housing is exposed to the fluid flowing about the tube bundle in the areas of the inlet and outlet, for extremely high temperature fluids these inlet and/or outlet zones may preferably be lined with additional insulation. The low temperature of the outer housing allows materials with lower temperature limitations and/or higher structural strength to be employed than in conventional designs. This allows the material thickness requirement to be far less than what has been required in conventional systems. Further, because the housing is everywhere separated from the highest temperature zones in the heat exchange reactor, and its temperature is consequently lower, far less energy is required to heat it than is required in conventional internal pressure shells.

Preferably, the insulation system includes at least one zone, more preferably two zones, more particularly preferably three zones, and most preferably more than three zones of insulation. These ranges include all values and subranges therebetween, including 4, 5, 6, 7, and 8 zones. These zones are desirably selected on the basis of load bearing capability, peak temperature capability, low thermal conductivity, low thermal mass, ease of fabrication and low material cost. In the heat exchange reactor of FIG. 1, the insulation is separated into two zones, a high load-bearing zone 9 and a zone of lower load bearing 7. The internal surfaces of both zones are preferably provided with means and/or features which closely match the profile of the tube bundle 1. These means or features preferably effect the manifolding of the gas flowing about the tube bundle by mating closely with the baffles 8 and are preferably formed by casting, vacuum casting, powder pressing, machining, or other techniques apparent to one skilled in the art. Preferably, the means or features are formed by casting, vacuum casting, or machining of rigid insulation board. In one especially-preferred embodiment, cast cement-bound refractory insulation is used. Examples of preferred cement-bound refractory insulation include RESCOCAST 3B for load-bearing applications or RESCOCAST 3-20R for applications with minimal load, both from Resco Products, Inc. of Norristown, Pa. In another especially-preferred embodiment, the features are machined into segments of rigid insulating board, which may be subsequently assembled to form the close-fitting insulating layer of the present invention. A preferred example of rigid insulating board is FIBREX FBX 2300 aluminosilicate board produced by American Fibrex of Joplin, Mo.

The internal insulation is preferably rigid and/or monolithic such that it is resistant to deformation, displacement or erosion by the action of the flowing heating and/or reactant fluid. The load-bearing insulation bears the majority of the combined compressive load of one or all of the tube bundle, manifold, inlets, outlets, ancillary equipment, and fluid(s). Preferably, a load bearing insulation zone supports an average compressive load of at least 1 pounds per square inch (psi). More preferably, a load bearing zone supports an average load of 2 psi or greater. It is especially preferable that the maximum point load on the insulation does not exceed its crush strength. The non-load bearing insulation is preferably self-supporting but is not required to bear the compressive loads as borne by the load-bearing insulation. Preferably, a non-load bearing zone of insulation supports an average load of less than 1 psi.

Figure 2:
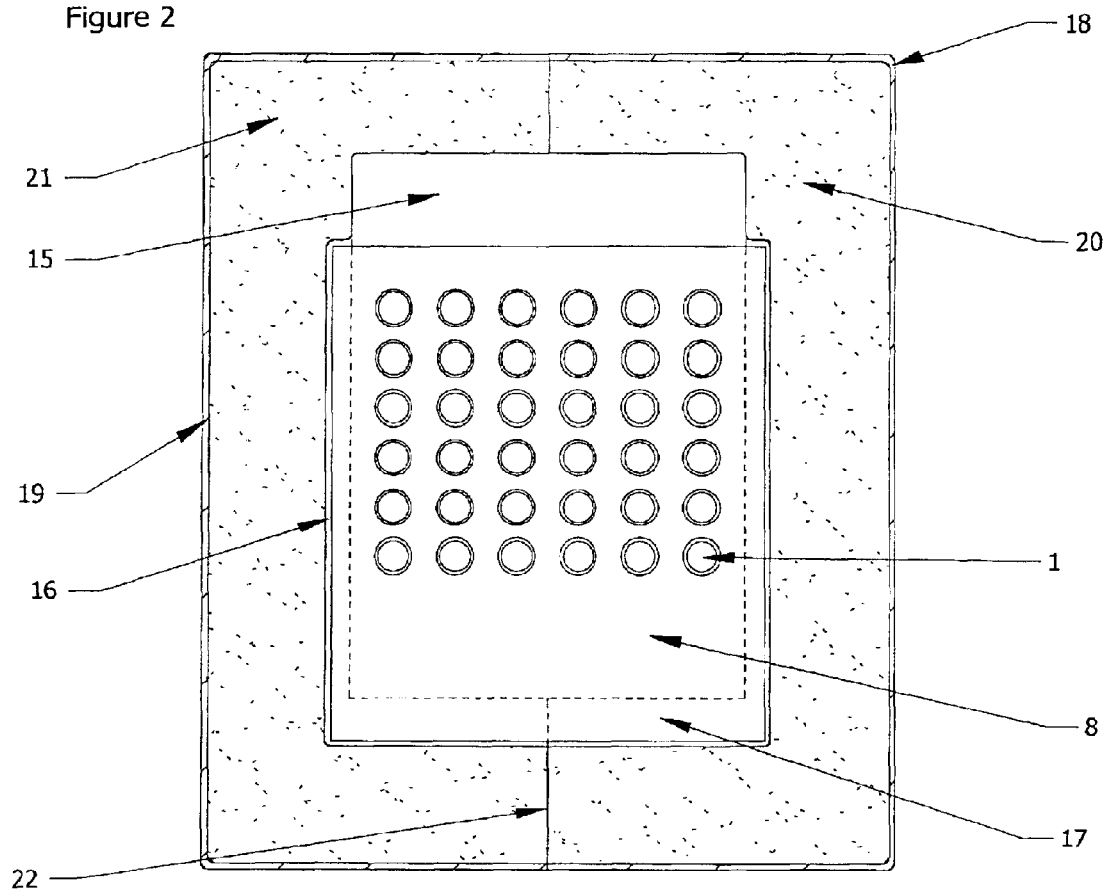
FIG. 2 is a section through the heat exchange reactor mounted in both halves of the integral housing in accordance with a preferred embodiment of the present invention at the location of a flow-manifolding baffle.

One embodiment of the manifolding features are shown in detail in the section view of FIG. 2, which shows a section of the heat exchange reactor assembly normal to the axis of the tube bundle 1 and through the centerline of the baffle 8. The baffle 8 is accommodated in a sealing groove 17 which is formed in the two halves of the insulation system 20 and 21. Depending upon the gap 16 between the baffle and the insulation layers, fluid bypassing around the tube bundle 1 is controlled and flow is forced through the open manifold area 15 around the end of the baffle.

The dimension of the gap 16 is not particularly limited, but it may be preferably controlled by applying close manufacturing tolerances to the insulation layers and outer housing halves 18 and 19. Because this approach may lead to high manufactured costs, alternative approaches are more preferred. One preferred approach is sealing the gap 16 with a compliant material. This compliant material can also compensate for differential thermal expansion between the inner insulation layers and the tube bundle both in the plane of the baffle and, more noticeably, along the longer axis of the tube bundle. Examples of the preferred materials are refractory cloth, refractory felt or refractory paper. The most preferred approach is to design the overall heat exchange reactor so that some degree of bypassing around each baffle is achieved. This most preferred approach then reduces the required tolerances for the recessed baffle groove 17, thus reducing the difficulty of manufacturing the baffle, insulation layers, and outer structural housing. This most preferred approach thus desirably reduces the manufacturing cost of these components. Finally, the most preferred approach minimizes or eliminates mechanical stresses due to contact between the baffle and the insulation layer due to differential thermal expansion.

An especially preferred embodiment of the integral housing of the present invention shown in FIG. 2 is the facilitation of the use of square, rectangular, and other shaped tube arrays. In conventional heat exchange reactors, such tube arrays were difficult to implement without providing for a square, rectangular, or other shaped internal pressure shell. The construction of such shaped internal pressure shells to close tolerances to limit flow bypassing is extremely expensive, thus limiting the practical application of conventional heat exchange reactors. The recessed sealing groove 17 of the integral housing of the present invention greatly reduces flow bypassing relative to the conventional techniques. Thus, the recessed sealing groove 17 provides surprising and unexpected advantages over conventional internal pressure shell construction, especially because it reduces the required tolerances of construction, not only for the integral housing assembly, but also for the baffles themselves. Further, the use of polygonal baffles and/or fins greatly reduces material wastage relative to the use of chorded or ring-type baffles for round internal pressure shells common in conventional systems.

The use of a square or rectangular tube array also desirably reduces the thermal stresses in the tube bundle compared to conventional systems. This reduction in stress facilitates both a longer operating lifetime of the heat exchange reactor and the reduction of the wall thickness of the tubes. Reducing the tube wall thickness desirably reduces the total thermal mass of the reactor, which further reduces both the duration of the warmup period and the quantity of energy required for warmup.

Additionally, the use of square or rectangular tube arrays particularly facilitates the use of an inner insulating layer fabricated by assembling machined sections of rigid insulating board. Such board may be machined using conventional tooling at a far more rapid rate than is possible in the machining of conventional metallic structural shells, which desirably reduces the time and expense required to achieve a close fit between the baffles and the insulating layer.

Another preferred embodiment of the invention shown in FIG. 2 includes the sealing groove 17 and the polygonal baffles and/or fins. The parting line 22, separates the sections of the insulating layer 20 and 21, and the segments of the outer housing 18 and 19. This parting line 22 is preferably located such that the parting plane is parallel to the tube bundle long axis and thus perpendicular to the plane of the baffles. This parting plane may be located at any position in the tube bundle, but is most preferably located along the centerline of the tube bundle as this facilitates easy forming of the insulation layers by the preferred method of casting. The insulation layers of the integral housing of the present invention may alternatively be formed from more than two segments and assembled subsequently, but the use of two segments is preferred in most instances to limit manufacturing costs when the methods of casting or vacuum casting are employed. The insulating layer is preferably assembled from four planar sections when the machined, rigid insulating board is employed. Sealing between the segments of the insulation layers may be accomplished by several means, including the use of a compliant sealing material, the application of a bonding agent to permanently or semi-permanently join the segments, or by means of a close-tolerance fit between the segments. Compliant sealing materials and bonding agents are not particularly limited, and may be any of those known in this art.

In another preferred embodiment of the present invention, the insulating layer which contains the formed features is cast with a close tolerance along the parting plane 22. This may be easily accomplished by gravity casting the segments of the insulating layer with a male pattern mounted on a flat, rigid surface. The resulting cast parts then possess an extremely flat parting surface and firmly-fixed tolerances for all of their features. In this preferred embodiment, the segments of the insulating layer are then assembled with these cast, flat surfaces mating, thus locating all of the formed features precisely. The relationship between these components may then be fixed mechanically by means of anchors or straps, or more preferably by compressive force applied by the outer housing and transmitted to the preferred, cast insulation layers either directly or via intervening insulation layers. These intervening insulation layers are preferably somewhat compliant while possessing some load-bearing properties. Examples of preferred intervening insulating layer materials are refractory fiber felt, refractory board, mineral wool board and glass fiber board. Mineral wool board such as ROXUL RHT 100, manufactured by Roxul, Inc. or mineral wool block such as FIBREX FBX 1900 block, manufactured by American Fibrex, of Joplin, Mo., are especially preferred.

In the preferred embodiment of assembly of the insulation layer from planar segments of machined, rigid insulating board, the tolerances of the board manufacture are controlled to achieve the required fit between the baffles and the sealing grooves. Gaps between individual planar segments may be filled using any of the methods described above, or may be left unfilled, especially if additional layers of intervening insulation are applied such that any or all seams are covered by the layers of intervening insulation. Individual planar sections may be secured to the inner tube bundle by means of a friction fit between the baffles and the insulating sections, by means of mechanical anchors, or by means of straps, safety wire, or other techniques known to one skilled in the art.

Alternatively, the insulating layers may be assembled into the outer housing, and may subsequently serve as a fixture into which the baffles may be placed. This assembly of outer housing, insulating layers and baffles may then serve as an assembly fixture for the placement of the tubes. Subsequent to tube placement, the manifolding means may be attached to the ends of the tubes.

The segmented outer housing may be formed in any shape, and the depiction of a rectangular housing in FIG. 2 is not meant to limit the practice of the present invention in any way. The segmented outer housing may be replaced by an outer housing which is formed around the assembled insulation layers and tube bundle, for example by sheet metal bending or rolling, or by application of resin bonded composite. If the outer housing has seams, these may be closed by welding, brazing, adhesive bonding, screws, rivets, seam rolling, or other techniques apparent to one skilled in the art. The outer housing material is not particularly limited, and any material of construction and technique of construction suited to the pressure and structural loads may be applied to form the outer housing of the present invention.

Figure 3:
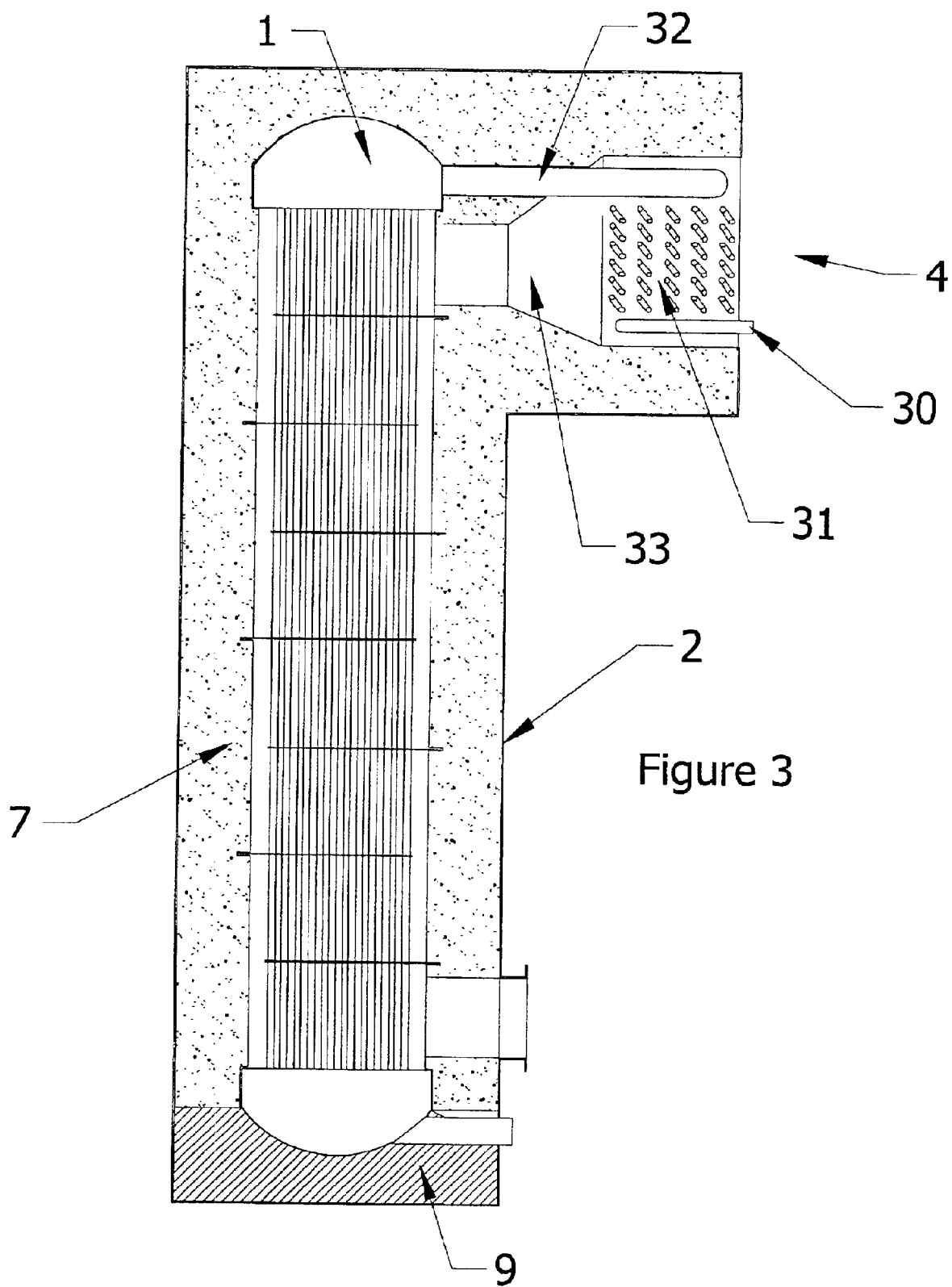
FIG. 3 is a section view showing a heat exchange reactor tube bundle and an associated heat exchanger and plumbing all mounted in a single integral housing in accordance with a preferred embodiment of the present invention.

FIG. 3 illustrates another preferred embodiment of the integral housing of the present invention. In this embodiment, one or more ancillary components to the principal heat exchange reactor are also located within the integral structural housing. In the example of FIG. 3, an ancillary heat exchanger 31 is mounted inside the integral housing. This ancillary heat exchanger is provided with its own tube-side inlet 30, and its tube-side outlet plumbing 32 is included inside the integral housing. In the preferred embodiment, the passageways for the plumbing between the components are either cast, machined or otherwise formed into the insulating layers 7, or the plumbing is actually cast into the insulating layers directly. The ancillary heat exchanger 31 is provided with an internal manifolding zone 33 between its flow passages and those of the tube bundle, and with a second opening 4 which may serve as an inlet or an outlet, in the outer structural housing 2. In the preferred embodiment of the present invention, any ancillary components added to the tube bundle and enclosed within the integral housing are placed such that their structural support and manifolding features may be formed into the insulating layer by any of the preferred methods. Preferably, the axes of symmetry of any ancillary components are advantageously aligned with those of the tube bundle to facilitate withdrawal of the male pattern from the formed insulation layers if the method of casting is employed. If planar sheets of rigid insulating board are employed, the overall shape of the components and the manifolding is preferably polygonal in form. If required, non-polygonal features may be formed into the rigid board by wet-forming, die-cutting, machining, compression-forming or any other technique known to those in this art.

Overhung ancillary components such as the heat exchanger 31 depicted in FIG. 3 may derive all of their structural support from the outer structural housing 2, thus imposing bending moments of the housing. Alternatively, the overhung components may be provided with external supports to prevent an imposition of bending stresses on the external structural support. Alternatively, internal supports connecting the overhung ancillary component to the tube bundle may be employed to support part or all of the mass of the ancillary components, and to transfer the resulting structural loads to the one or more load-bearing insulation zones.

One preferred heat exchange means is a compact steam boiler or steam boiler and superheater. Another preferred heat exchange means is an aftercooler, which preferably heats the incoming shell-side fluid by removing heat from the tube-side fluid. More than one heat exchange means may be integrated into the integral housing of the present invention. In one particularly preferred embodiment, two or more ancillary heat exchange means are integrated into the housing.

A preferred example of ancillary equipment is a mixing apparatus for combining steam and hydrocarbon fuel at the inlet of the tube-side manifold 10.

A preferred adiabatic reactor is a water-gas shift reactor. Another preferred example of an adiabatic reactor is a hydrodesulfurization reactor.

A preferred burner is a spark-ignited natural gas fired burner, such as the BIO 50 burner produced by Kromschroder, Inc. of Hudson, Ohio. Other types of burners using different fuels, different types of ignition, or different types of combustion (i.e. catalytic combustion) are also suitable.

Preferred absorbents includes a sulfur absorbent bed employing zinc oxide, or other suitable sulfur absorbents known to one skilled in the art. A preferred adsorbent includes an activated charcoal bed for removing feedstock impurities such as halides.

Inclusion of ancillary components such as safety burst disks, vent plumbing, supply plumbing, filters, adsorbers, absorbers, water traps, heat exchangers and the like within the integral structural housing offers several suprising advantages over the provision of separate insulation and structural support for these components. First, both the components and their plumbing are located within the same thermal envelope as the heat exchange reactor. The heat lost from the tube bundle of the heat exchange reactor is thus beneficially absorbed by the ancillary components, thus reducing total energy consumption. Second, the total external surface area in contact with the ambient is reduced, thus beneficially reducing heat loss to the ambient for a given volume, and thus mass, of thermal insulation. This desirably reduces the thermal mass of the total insulation system markedly, while simultaneously reducing steady-state heat loss to the ambient from the interconnected components relative to conventional systems. Finally, because the structural support is transferred via the insulation to the external housing, the strength per unit mass of the structural support is favorably increased, thus beneficially further reducing the thermal mass of the system. Finally, the novel internal insulation layer with internal features for manifolding flow between the tube bundle and the ancillary components allows the elimination of external manifolding required in the conventional systems. The external manifolding required by the conventional systems undesirably adds thermal mass, structural load, material cost, manufacturing cost and assembly cost.

The integral housing of the present invention offers numerous surprising advantages over conventional multi-component housing systems for heat exchange reactors using a tube bundle. First, the integral housing reduces the thermal mass of the overall system. This reduces both the warmup time and energy required for system start-up. Second, the integral housing reduces steady state heat loss by transmitting the structural load of the tube bundle and any ancillary components through insulation layers with load-bearing capacity to an outer housing. This outer housing, which operates at a much lower temperature than the tube bundle and thus conventional internal pressure shells, is far stronger per unit mass of structure and thus advantageously further reduces the system thermal mass compared to conventional systems. Third, the integral housing of the present invention facilitates the use of square, rectangular and other polygonal tube arrays with far larger fabrication tolerances than those feasible in conventional systems. The use of these polygonal tube arrays reduces thermal stresses in the tubes, thus reducing the mass of tube material required. The use of polygonal tube arrays also results in far less scrap in the fabrication of baffles and fins than is achieved in round or chorded tube arrays, thus desirably reducing material cost. Finally, the segmented insulation layers and external structural housing of the present invention are far easier to construct, have far larger tolerances, and can be manufactured at far lower cost than conventional designs.

The number of baffles is not particularly limited, and may be freely chosen as appropriate. Preferably, however, the present invention includes from 1 to 30 baffles, more preferably from 2 to 20 baffles, more particularly preferably from 3 to 10 baffles, and most preferably from 4 to 9 baffles. These ranges expressly include 5, 6, 7, 11, 12, 15, 25 and 28 baffles.

The number of tubes is not particularly limited, and may be freely chosen as appropriate. Preferably, however, the present invention includes from 1 to 300 tubes, more preferably from 25 to 200 tubes, more particularly preferably from 50 to 150 tubes, and most preferably from 80 to 130 tubes. These ranges expressly include 2, 15, 45, 55, 65, 95, 100, 125, 175, 225 and 250 tubes.

The tube diameters, baffle tolerances, and shell thicknesses are likewise not particularly limited, and may be of any dimension suitable for the application. Preferable dimensions are provided in *Standards of the Tubular Exchanger Manufacturers Association*: $8^{th}$ *Edition* and the 1998 *ASME Pressure Vessel Code, Section 8, Division 1*, Jul. 1, 1998, *American Society of Mechanical Engineers*, the relevant contents of each of which being hereby incorporated by reference, the same as if set forth at length.

The tube bundle may be provided with catalysts to facilitate the reaction or reactions being conducted. These catalysts may be in any of the forms known to one skilled in the art. The catalysts may be placed inside the tubes, in contact with the tube-side fluid, or outside the tubes, in contact with the shell-side fluid. Preferably, the catalysts will be present as granulates, extrusions, tablets or coatings. An example of an especially preferred catalyst is a catalyst to promote the steam reformation of hydrocarbons. A second especially preferred catalyst promotes the water gas shift reaction to convert carbon monoxide and steam into carbon dioxide and hydrogen. A third especially preferred catalyst is a combustion catalyst. More than one type of catalyst may be employed in the tube bundle. U.S. application Ser. No. 09/642,008 filed Aug. 21, 2000, the entire contents of which are hereby incorporated by reference, discloses examples of particularly preferred catalysts and combinations of catalysts to be used in the tube bundle.

The shape in which the tubes are arrayed or placed in the baffles is not particularly limited, and may be chosen as appropriate. Preferably, however, the tubes may be arrayed in a "hexagonal close packed" or "cubic close packed" arrangement. In addition, the perimeter of the tube array may adopt a polygonal shape with n sides and n corners. Preferably, the n's have values of 3, 4, 5, 6, 7, 8, 9, and 10. Most preferably, n is 4.

Although FIGS. 1 and 3 show that any particular manifold opening is opposed to that of its nearest neighbors' manifold openings, i.e., in an alternating, "left-right" manner, the invention is not limited thereto. The manifold openings may be opposed to that of their next-nearest neighbors, or of their next to next nearest neighbors.

Obviously, numerous modifications and variations of the present invention are possible in light of the above teachings. It is therefore to be understood that within the scope of the appended claims, the invention may be practiced otherwise than as specifically described herein.

What is claimed is:

1. A heat exchange reactor, comprising:
   at least one tube bundle comprising a plurality of tubes arranged substantially parallel to a common longitudinal axis and within an external pressure housing, said bundle comprising first and second ends in respective first fluid communication with at least one first fluid inlet and at least one first fluid outlet, and said external pressure housing comprising at least one second fluid inlet and at least one second fluid outlet;
   at least one baffle oriented substantially perpendicular to the longitudinal axis and disposed about said bundle and configured as a manifold to control a flow of said second fluid; and
   at least one layer of interior thermal cement-bound refractory insulation disposed between said bundle and said housing and in fluid communication with said second fluid,
   wherein said insulation comprises a load-bearing zone configured to support an average compressive load of at least one pound per square inch and a non-load bearing zone configured to support an average compressive load of less than one pound per square inch, and wherein said insulation is made from a first material in said load-bearing zone and a second material in said non-load bearing zone, and wherein said first material is different from said second material.

2. The reactor according to claim 1, further comprising a plurality of said baffles.

3. The reactor according to claim 1, wherein said baffle has a planar polygonal shape.

4. The reactor according to claim 1, wherein said baffle has a planar polygonal shape with n sides and n corners.

5. The reactor according to claim 4, wherein n is 4.

6. The reactor according to claim 1, wherein said insulation comprises a sealing groove, and wherein a portion of said baffle is mated to said sealing groove.

7. The reactor according to claim 6, further comprising at least one compliant sealing material disposed between said sealing groove and said portion of the baffle.

8. The reactor according to claim 1, wherein said baffle includes a plurality of holes, and wherein said plurality of tubes extend through said plurality of holes.

9. The reactor according to claim 1, wherein said insulation supports said tube bundle.

10. The reactor according to claim 1, further comprising at least one selected from the group consisting of support means, ancillary equipment, heat exchanger means, burner means, adiabatic reactor means, absorbent means, adsorbent means, plumbing means, and combinations thereof.

11. The reactor according to claim 1, wherein said insulation comprises at least one parting plane parallel to said tubes and perpendicular to a plane of said baffle.

12. A method for exchanging heat, comprising heating or cooling a first fluid with a second fluid in the heat exchange reactor according to claim 1.

13. A method of carrying out a reaction, comprising carrying out a reaction in a first fluid while exchanging heat with a second fluid in the heat exchange reactor according to claim 1.

14. A method for making the heat exchange reactor according to claim 1, comprising:
   (a) preparing at least one tubebundle comprising the catalysts, a plurality of substantially parallel tubes and at least one baffle disposed about said bundle;
   (b) mating a portion of said baffle to at least one sealing groove in a layer of thermal insulation; and
   (c) contacting the insulation with the external pressure housing.

15. A method for making the heat exchange reactor according to claim 1, comprising:
   (a) fabricating said housing;
   (b) contacting at least one layer of the thermal insulation with the housing;
   (c) mating a portion of at least one baffle to at least one sealing groove in the insulation to form an assembly fixture; and
   (d) assembling the tube bundle with the assembly fixture.

16. The reactor according to claim 1, wherein said plurality of tubes are arranged in a rectangular array or a square array.

17. The reactor according to claim 16, wherein said external pressure housing has a rectangular or square cross-section.

* * * * *